(12) United States Patent
Cornet (10) Patent No.: US 9,330,077 B2
(45) Date of Patent: May 3, 2016

(54) DYNAMIC IMAGE GENERATION FOR CUSTOMIZABLE USER INTERFACES

(75) Inventor: Manu Cornet, Paris (FR)

(73) Assignee: GOOGLE INC., Mountain View, CA (US)

( * ) Notice: Subject to any disclaimer, the term of this patent is extended or adjusted under 35 U.S.C. 154(b) by 573 days.

(21) Appl. No.: 12/621,422

(22) Filed: Nov. 18, 2009

(65) Prior Publication Data

US 2015/0193388 A1 Jul. 9, 2015

(51) Int. Cl.
*G06F 3/048* (2013.01)
*G06F 17/22* (2006.01)

(52) U.S. Cl.
CPC .................................. *G06F 17/227* (2013.01)

(58) Field of Classification Search
USPC ......................................................... 715/846
See application file for complete search history.

(56) References Cited

U.S. PATENT DOCUMENTS

| | | | | |
|---|---|---|---|---|
| 2003/0009537 A1* | 1/2003 | Wang | | 709/219 |
| 2005/0050474 A1* | 3/2005 | Bells et al. | | 715/747 |
| 2006/0265662 A1* | 11/2006 | Gertzen | | 715/760 |
| 2010/0169357 A1* | 7/2010 | Ingrassia et al. | | 707/769 |
| 2010/0299586 A1* | 11/2010 | Yoo et al. | | 715/207 |
| 2010/0333003 A1* | 12/2010 | Zurmuehl et al. | | 715/765 |

OTHER PUBLICATIONS

Wagner, Ashley, Google Themes for your Personalized Homepage Change with Time and Weather, Mar. 20, 2007, http://cybernetnews.com/google-themes-for-your-personalized-homepage-change-with-time-and-weather/.*

* cited by examiner

*Primary Examiner* — William Trapanese
(74) *Attorney, Agent, or Firm* — Morgan, Lewis & Bockius LLP (57) ABSTRACT

A system and method to define icon color of an icon image for program themes. At a server having a processor and storage, an icon definition file that includes a color handle and a shape definition of a first icon are stored. A plurality of cascading style sheets, each corresponding to a respective program theme, are also stored at the server. Each of the cascading style sheets corresponds to a respective program theme and includes a color definition mapped to the color handle. At the server, an active theme from among the program themes and an icon color, using the color definition associated with the active theme, are determined. An icon image for the first icon is then created based on the shape definition and the icon color.

19 Claims, 7 Drawing Sheets

```
<path d="M 1481.4903,423 C 1513.8376,423 1540.0594,448.449
1540.0594,479.842 C
1540.0594,511.236 1513.8376,536.685 1481.4903,536.685 C
1449.1441,536.685
1422.9223,511.236 1422.9223,479.842 C 1422.9223,448.449
1449.1441,423
1481.4903,423 M 1481.4903,403 C 1437.8327,403 1402.315,437.471
1402.315,479.842 C 1402.315,522.213 1437.8327,556.685
1481.4903,556.685 C
1525.1479,556.685 1560.6667,522.212 1560.6667,479.842 C
1560.6667,437.472
1525.1479,403 1481.4903,403 L 1481.4903,403 z"

id="ICON_SET_TRANSLATE_CONVERSATION_STROKE_COLOR" />
```

202 — (path d)
204 — (id)

```
/* Definition of the colors to be applied to icons */
@def ICON_SET_TRANSLATE_CONVERSATION_STROKE_COLOR    #000; /* black */
.
.
.
@def ICON_SET_PRINT_ALL_STROKE_COLOR            #f00; /* red */
.
.
.
/*icon "sprite" */
@def ICON_TRANSLATE_CONVERSATION_BG ICON_IMG_URL no-repeat -140px -
40px;
.
.
.
/* CSS code that is sent to the client */
.the-translate-icon-class {
   background: ICON_TRANSLATE_CONVERSATION_BG;
}
```

DYNAMIC IMAGE GENERATION FOR CUSTOMIZABLE USER INTERFACES

TECHNICAL FIELD

The disclosed embodiments relate generally to customizing graphical user interfaces of computer applications. More particularly, the disclosed embodiments relate to dynamically generating images for customizable graphical user interfaces of online applications.

BACKGROUND

Computer users are generally able to customize the graphical user interfaces of computer applications. Additionally, many online applications, such as web-based email applications allow users to customize their interfaces or appearance of the online application with different colors, fonts, images, line widths, and the like. For example, with certain online applications, users may select a theme from a menu of different themes to be applied to the appearance of an online application. Themes often include associated images for elements of the theme/application (such as icons to show that an email message is new) and define particular colors associated with those various images. Conventionally, the style and appearance of a theme (and its elements) are represented in one or more corresponding cascading style sheets (CSS). Typically, the CSS for a theme defines the theme's image shapes and their associated colors as hard-coded values. Images were edited manually (e.g., in Photoshop), one by one, for each theme and referenced directly from the CSS. Accordingly, in such systems it is time-consuming and inefficient to change the color of an image used in the CSS as this requires modification/reprogramming of the CSS code that defines the color of the image.

SUMMARY

In order to minimize the number of changes that need to be made to a cascading style sheet (CSS) when a user changes themes or the color (or other attribute) of an image, the shape and color information associated with the image are stored separately. The shape information images or icons are stored in icon definition files, each of which contains a color handle. The color information is stored in the CSS as a variable color definition and is mapped to the color handle of the icon definition file. Accordingly, in order to change the color of the image, only the color definition is changed.

A method for defining icon color for program themes includes, at a server having a processor and storage, storing an icon definition file that includes a color handle and a shape definition of a first icon and storing a plurality of cascading style sheets, each corresponding to a respective program theme. Each of the cascading style sheets corresponds to a respective program theme and includes a color definition mapped to the color handle. The method further includes, at the server, determining an active theme from among the program themes, determining an icon color using the color definition associated with the active theme, and creating an icon image for the first icon based on the shape definition and the icon color.

In some embodiments, the method further includes sending the icon image to a client using the active theme for a particular program.

In further embodiments, the method also includes storing a plurality of icon definition files, wherein each icon definition file includes a color handle and a shape definition of one of a plurality of icons, determining an icon color for each of the plurality of icons using the color definition associated with the active theme, and creating a plurality of icon images, wherein each of the plurality if icon images is for one of the plurality of icons based on the corresponding shape definition and the corresponding icon color. In other embodiments, the method also includes storing one or more icon images of the plurality of icon images in an icon image file, wherein the icon image file is associated with one of the cascading style sheets.

A system for defining icon color for program themes includes memory, one or more processors and one or more modules stored in memory and configured for execution by the one or more processors. The modules include instructions to store an icon definition file that includes a color handle and a shape definition of a first icon, and instructions to store a plurality of cascading style sheets. Each of the cascading style sheets corresponds to a respective program theme and includes a color definition mapped to the color handle. The modules further include instructions to determine an active theme from among the program themes, instructions to determine an icon color using the color definition associated with the active theme, and instructions to create an icon image for the first icon based on the shape definition and the icon color.

In some embodiments, the modules include instructions to send the icon image to a client using the active theme for a particular program.

In further embodiments, the modules also include instructions to store a plurality of icon definition files, wherein each icon definition file includes a color handle and a shape definition of one of a plurality of icons, instructions to determine an icon color for each of the plurality of icons using the color definition associated with the active theme, and instructions to create a plurality of icon images, wherein each of the plurality if icon images is for one of the plurality of icons based on the corresponding shape definition and the corresponding icon color. In other embodiments, the modules also include instructions to store one or more icon images of the plurality of icon images in an icon image file, wherein the icon image file is associated with one of the cascading style sheets.

A computer program product for use in conjunction with a computer system includes a computer readable storage medium and a computer program mechanism embedded therein. The computer program mechanism includes instructions to store an icon definition file that includes a color handle and a shape definition of a first icon, and instructions to store a plurality of cascading style sheets. Each of the cascading style sheets corresponds to a respective program theme and includes a color definition mapped to the color handle. The computer program mechanism further includes instructions to determine an active theme from among the program themes, instructions to determine an icon color using the color definition associated with the active theme, and instructions to create an icon image for the first icon based on the shape definition and the icon color.

In some embodiments, the computer program mechanism includes instructions to send the icon image to a client using the active theme for a particular program.

In further embodiments, the computer program mechanism also includes instructions to store a plurality of icon definition files, wherein each icon definition file includes a color handle and a shape definition of one of a plurality of icons, instructions to determine an icon color for each of the plurality of icons using the color definition associated with the active theme, and instructions to create a plurality of icon images, wherein each of the plurality if icon images is for one of the plurality of icons based on the corresponding shape definition and the corresponding icon color. In other embodiments, the computer program mechanism also includes instructions to store one or more icon images of the plurality of icon images in an icon image file, wherein the icon image file is associated with one of the cascading style sheets.

In some embodiments, the icon image file is in a portable network graphics format, and, in some embodiments, the shape definition is in scalable vector graphics format. In other embodiments, the color definition is a user defined variable. In some embodiments, the icon images of the icon image file correspond to icons for a particular program.

In some embodiments, the active theme is user-selected from a plurality of themes presented on the client.

BRIEF DESCRIPTION OF THE DRAWINGS

Like reference numerals refer to corresponding parts throughout the drawings.

DESCRIPTION OF EMBODIMENTS

Please note that throughout this specification, the terms image and icon are used interchangeably.

Figure 1A:
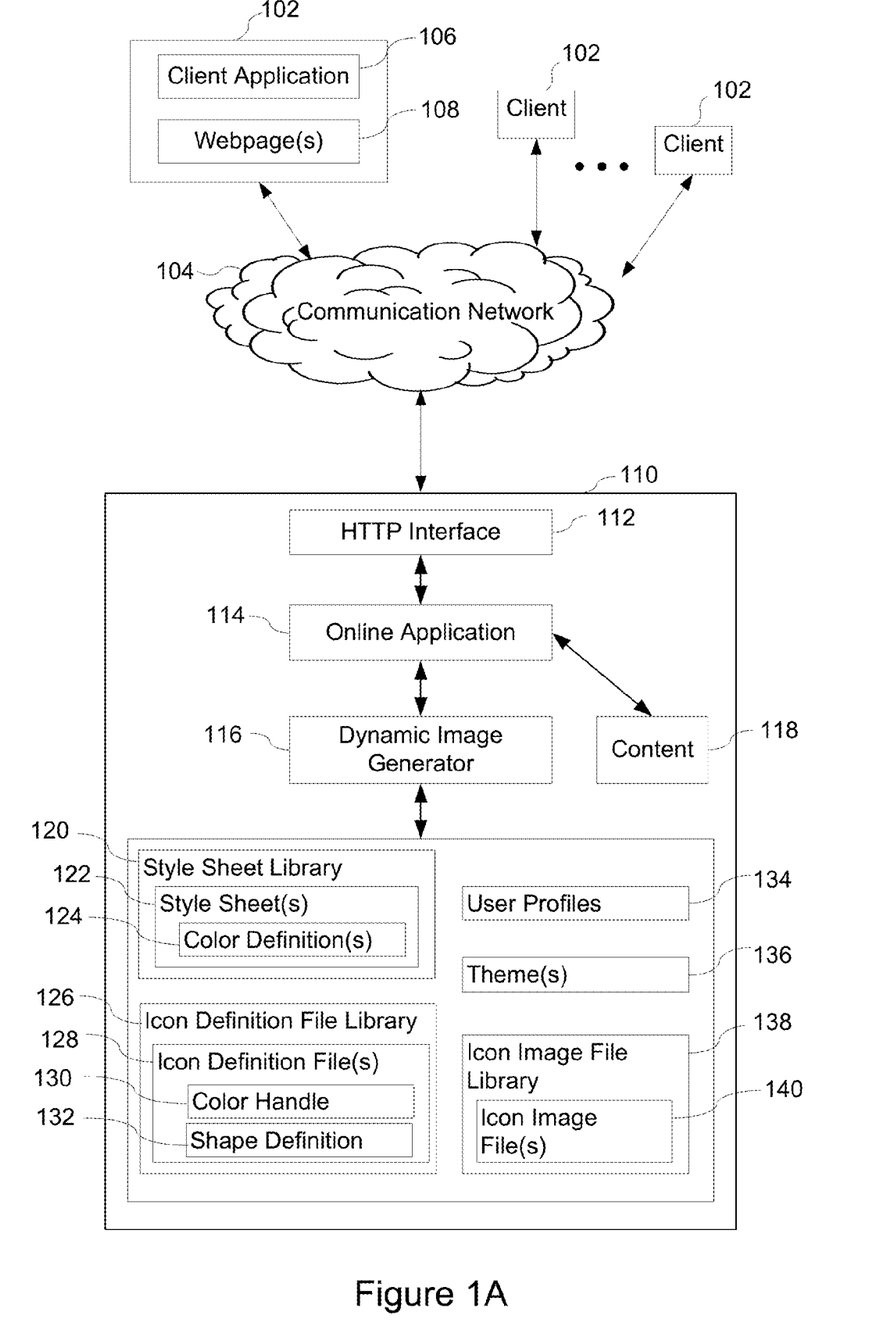
FIG. 1A is a block diagram illustrating a system for defining icon color for program themes in accordance with some embodiments of the present invention.

FIG. 1A is a diagram illustrating a system for dynamically generating webpages with dynamically generated or dynamically selected images. One or more computers or devices (hereinafter, "clients" or "client devices") 102 may be connected to a communication network 104. The client may be any of a number of devices (e.g., a computer, an internet kiosk, a personal digital assistant, a cell phone, a desktop computer, or a laptop computer) and may include one or more client applications 106. The client applications 106 may permit a user to view webpages 108 or other documents or information. The client application 106 may be a software application that permits a user to interact with the client 102 and/or network resources to perform one or more tasks. For example, the client application 106 may be a web browser (e.g., Chrome, Firefox, Internet Explorer, or Safari) or another type of application that permits a user to search for, browse, and/or use resources, such as one or more webpages on the client 102 and/or accessible via the communication network 104. The client application may also include an email application (e.g., Outlook, or Lotus Notes).

The communication network 104 may be any local area network (LAN) and/or wide area network (WAN), such as an intranet, an extranet, the Internet, or a combination of such networks. It is sufficient that the communication network 104 provides communication capability between the clients 102 and an information server 110. In some embodiments, the communication network 104 uses HyperText Transport Protocol (HTTP) to transport information using the Transmission Control Protocol/Internet Protocol (TCP/IP). The HTTP permits client computers to access various resources available via the communication network 104. The various embodiments of the invention, however, are not limited to the use of any particular protocol. The term "resource" as used throughout this specification refers to any piece of information or service that is accessible via a Uniform Resource Locator (URL) and can be, for example, a webpage, a text or word processing document, an email message, a transcribed voice message, a database, an image, or a computational object.

The communication network 104 may be connected to the information server 110. The server 110 may include an HTTP interface 112, one or more online applications 114, and a dynamic image generator 116. The server may also include a processor (e.g., processor 502 (FIG. 5)) and storage (e.g., memory 508 (FIG. 5)).

The HTTP interface 112 facilitates communication between the communication network 104 and the online applications 114. The online applications 114 may be configured to send and receive content 118. The online applications 114 may be a webmail application or other type of personalized online application that is utilized in displaying various content 118.

The dynamic image generator 116 may include or be connected to the following: a style sheet library 120 that includes one or more style sheets 122, each of which includes one or more color definitions 124; a icon definition file library 126 that includes one or more icon definition files 128, each of which includes a color handle 130 and a shape definition 132; one or more user profiles 134; one or more themes 136; and an icon image file library 138 that includes one or more icon image files 140.

Figure 1B:
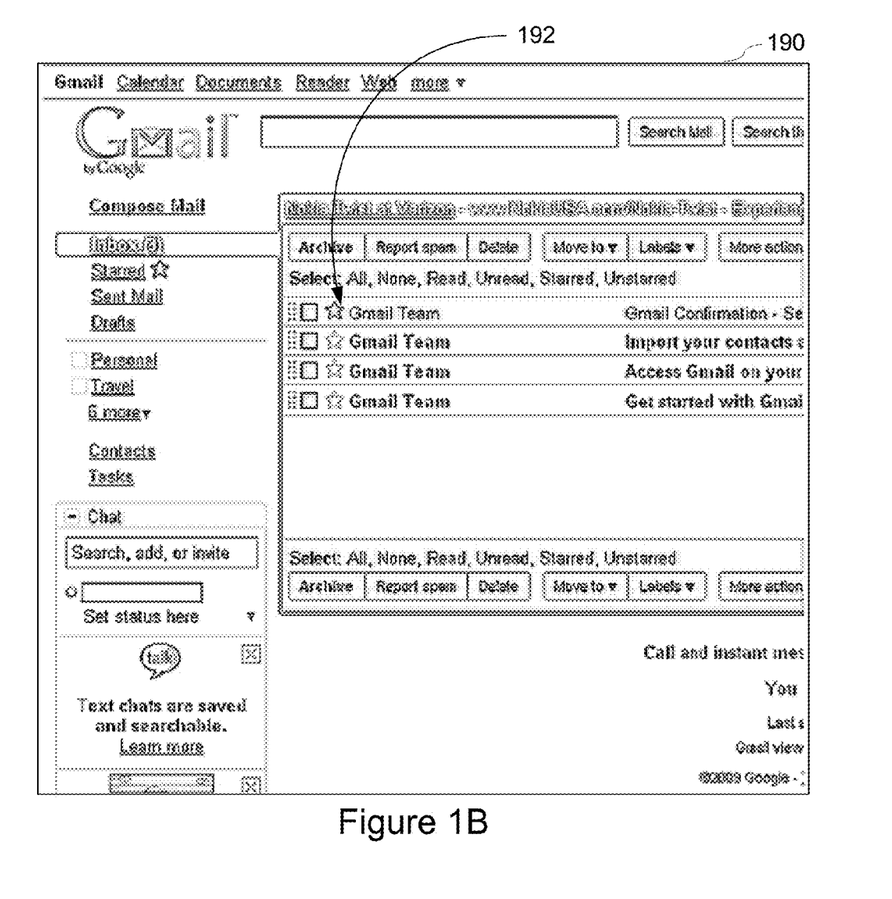
FIG. 1B is a screen shot illustrating a user interface of a webmail application in accordance with some embodiments of the present invention.

The icon definition file library 126 includes a plurality of icon definition files 128, each corresponding to graphic elements or icon images used in the webpages. While not shown in FIG. 1A, many individual graphic elements or icon images (e.g., star, tree, logo, etc.) are associated with each of the themes 136. FIG. 1B is a screen shot of an exemplary user interface 190 of a webmail application utilizing some embodiments of the present invention. As shown in FIG. 1B, many graphic elements (e.g., highlight and/or background) or icon images (e.g., star 192) are used. Some of the icon images may be used in multiple themes 136 (FIG. 1A). For example, a star 192 may be in both a first theme and a second theme. Each of the icon images is also associated with a color (e.g., red, blue, green, etc.), but the color may be different for each theme. For example, the star 192 in the first theme may be red, while the star 192 in the second theme is blue.

Figure 2A:
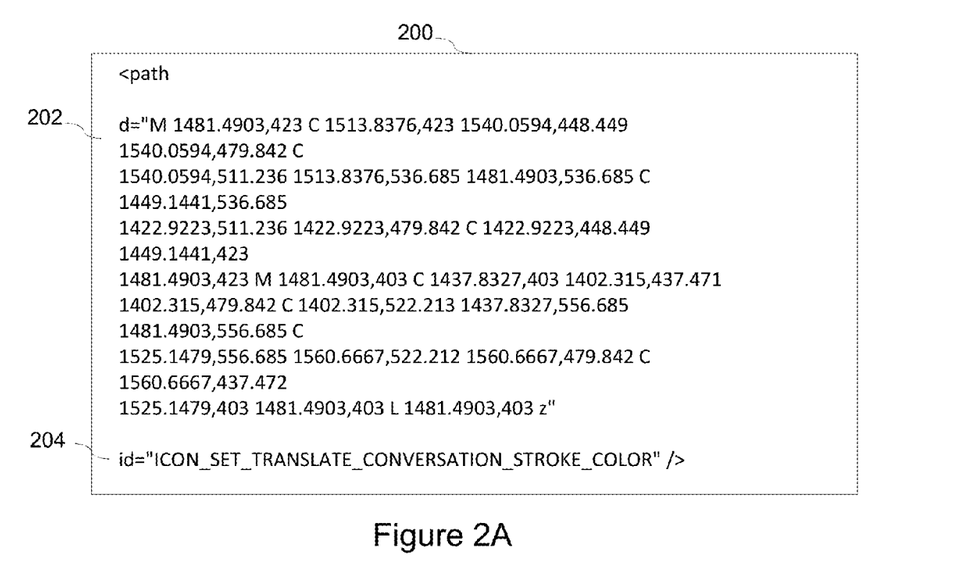
FIG. 2A illustrates exemplary scalable vector graphics source code for an exemplary icon definition file in accordance with some embodiments of the present invention.

FIG. 2A illustrates an exemplary icon definition file 200 in accordance with some embodiments. The icon definition file 200 is an example of icon definition file 128 (FIG. 1A). As stated above, an icon definition file 128 (FIG. 1A) corresponds to a graphic element or icon image. For example, a particular icon definition file 128 may correspond to a star 192 (FIG. 1B). As shown in FIG. 2A, an icon definition file 200 includes a color handle 204 and a shape definition 202. In some embodiments, e.g., the embodiment shown in FIG. 2A, the icon definition file 200 is in scalable vector graphic (SVG) format. The shape definition 202 defines the shape of the icon. While the shape of the icon can be any number of shapes (e.g., circle, square, line, etc.), the coordinates of shape definition 202 define a shape that is a circle with a thick border. Further, while there is only one shape definition 202 shown in FIG. 2A, some embodiments may include several shape definitions per icon definition file 200. The color handle 204 defines a variable (e.g., "ICON_SET_TRANSLATE_CONVERSATION_STROKE_COLOR") as the color for the defined icon. In some embodiments, a name of the shape is the same as the variable. The variable in the color handle 204 points to a color definition 124 (FIG. 1A) in the one or more style sheets 122 (FIG. 1A) that is used by the dynamic image generator 116 (FIG. 1A) to apply a color (in accordance with the theme) to the shape definition 202.

Figure 2B:
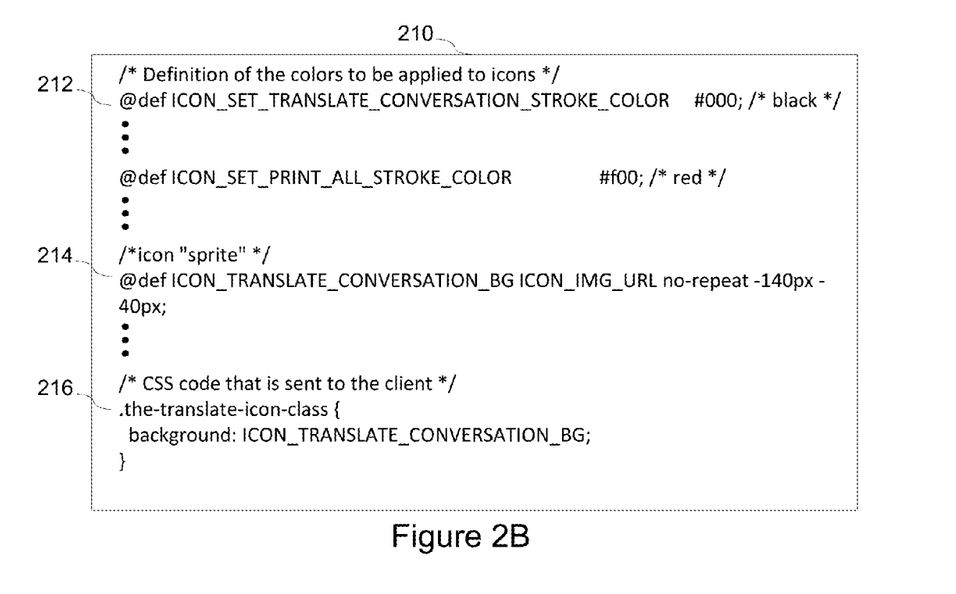
FIG. 2B illustrates exemplary source code for an exemplary style sheet in accordance with some embodiments of the present invention.

FIG. 2B illustrates an exemplary style sheet 210 in accordance with some embodiments. As stated above, a style sheet library 120 (FIG. 1A) includes one or more style sheets 122 (FIG. 1A), and each style sheet 122 includes one or more color definitions 124 (FIG. 1A). Each style sheet 122 (FIG. 1A) is associated with a theme 136 (FIG. 1A). Style sheet 210 is an example of style sheet 120 (FIG. 1A). As shown in FIG. 2B, the style sheet 210 includes a color definition 212. The color definition 212 defines the variable (e.g., "ICON_SET_TRANSLATE_CONVERSATION_STROKE_COLOR") as being a certain color (e.g., #000, which is a hexadecimal color code corresponding to the color black). In some embodiments, the color (e.g., #000) is determined by the theme 136 selected by a user of a client 102 (FIG. 1A). In other embodiments, the user of a client 102 may select a color for a specific icon independent of theme 136 (FIG. 1A). In some embodiments, information about the selected theme or color for a specific icon independent of theme selected by the user is stored in the user's user profile 134 (FIG. 1A).

In some embodiments, the method of defining color separately from shapes can be applied to an image file that includes multiple icon sprites, in which case a style sheet 210 can include one or more color definitions that are referenced by one or more of the individual sprites included in the single image file. In some embodiments, the style sheet 210 uses a technique called "image spriting" so that the server 110 (FIG. 1A) may send a large number of small icons to the client 102 (FIG. 1A) without sending each individual icon independently. Image spriting allows the server 110 (FIG. 1A) to send one single, large image with all the small icons tiled in it. The client 102 (FIG. 1A) may then show a subset of the large image, one icon at a time, when needed. Accordingly, in some embodiments, the style sheet 210 includes an icon sprite 214 and CSS code 216 as shown in FIG. 2B. The icon sprite 214 contains coordinates to where in the large image that the desired image is located. The CSS code 216 is what is sent to the client 102 (FIG. 1A).

Returning to FIG. 1A, the dynamic image generator 116 generates an icon image in accordance with one or more user-selected variables (e.g., theme or color for a specific icon). Alternately, the dynamic image generator 116 selects an icon image file from a set of previously generated icon image files 140 stored in the icon image file library 140, in accordance with one or more user-selected variables. The various icon images are independent of the webpage content 118 that is sent and received. The process by which the icon images are generated by the dynamic image generator 116 is described in more detail below in connection with FIGS. 3 and 4A-B.

The dynamic image generation as described may be used by any web-based application, such as web-based email applications, that allow users to customize their interfaces or appearance of the online application with different themes, colors, fonts, images, line widths, and the like. In some embodiments, a theme may include different variations that change based on the time of day (e.g., the background is red at sunrise, yellow at noon, and blue/black at midnight). Each of these variations corresponds to a unique image. Each of the unique images may be generated on-the-fly or generated offline and stored at the server using the dynamic image generation of the present invention.

Figure 3:
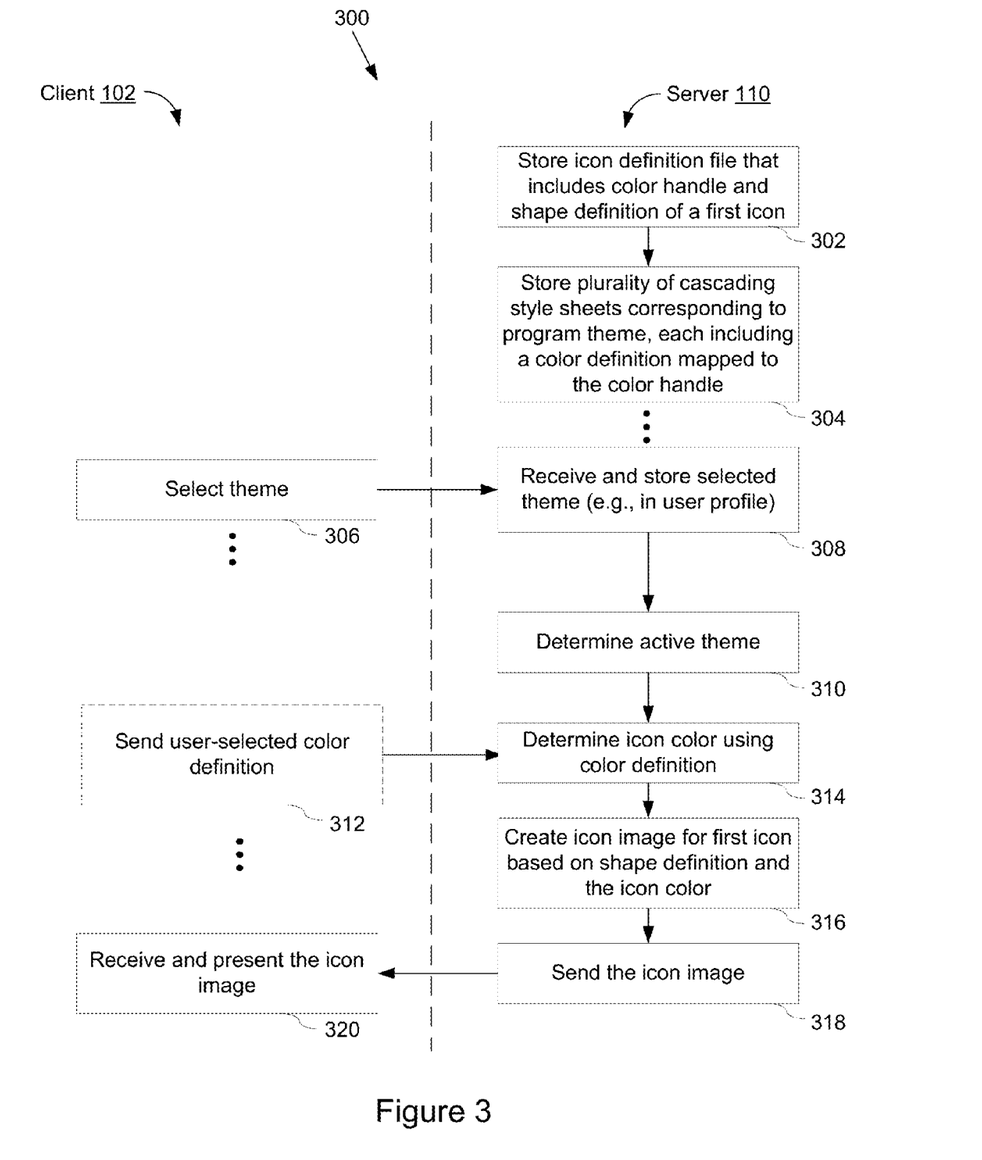
FIG. 3 is a flow diagram illustrating a process for dynamically defining icon color for program themes in accordance with some embodiments of the present invention.

FIG. 3 is a flow diagram illustrating a process 300 for dynamically generating icon color and other attributes in accordance with some embodiments of the present invention. A plurality of icon definition files (e.g., icon definition file 128 (FIG. 1A)) are stored at the server 110 (302). In some embodiments, the plurality of icon definition files are stored in an icon definition file library (e.g., icon definition file library 126 (FIG. 1A)). As detailed above in connection with FIG. 1A, each of the plurality of icon definition files includes a color handle (e.g., color handle 130 (FIG. 1A)) and a shape definition of a first icon.

Additionally, a plurality of cascading style sheets (e.g., style sheet 122 (FIG. 1A)), each corresponding to a respective program theme (e.g., theme 136 (FIG. 1A)), are stored at the server 110 (304). In some embodiments, the plurality of cascading style sheets are stored in a style sheet library (e.g., style sheet library 120 (FIG. 1A)). As detailed above in connection with FIG. 1A, each of the plurality of cascading style sheets includes at least one color definition (e.g., color definition 124 (FIG. 1A)) that is mapped to the color handle.

In some embodiments, a user of a client 102 may select a theme (306) in order to customize the user interface of an application, such as a webmail application. The themes selected by the user may include, but are not limited to, color (e.g., blue, gray, red, etc.), or destinations (e.g., beach, mountains, ocean, etc.), or others (e.g., Halloween, random, etc.). In some embodiments, these themes are presented in a user interface of a client application, such as a webmail application.

The server 110 then receives the selection and stores information about the selected theme in association with information about the user (308). In some embodiments, the information about the selected theme may be stored in the user profile 134 (FIG. 1A). In some embodiments, the user-selected theme is independent of the content of the webpages being displayed, and thus the values of the themes and the resulting images are also independent of the content of the webpages being displayed.

The server 110 determines the active theme (310) selected by the user. As described above, the theme typically includes one or more icons with a variable color definition.

The server 110 then determines an icon color using the color definition (314) by accessing the color definition in the style sheet associated with the active theme. In some embodiments, the client 102 may send a user-selected color definition to the server 110 (312). The server 110 then creates an icon image for the first icon based on the shape definition associated with the first icon and the icon color (316). In some embodiments, the icon image is stored at the server in an icon image file (e.g., icon image file 140 (FIG. 1A), which may be in an icon image file library (e.g., icon image file library 138 (FIG. 1A)).

The server 110 then sends the icon image for the first icon to the client (318). The client 102, therefore, may receive and present the icon image for the first icon (320).

In some embodiments, the client 102 requests a specific version of an icon (e.g., "red circle for theme 1"). The server 110 then accesses the icon image file library and determines if the specific version of the icon has already been created and saved in an icon image file and, if it has, the server 110 then sends the icon image file to the client 102.

Figure 4A:
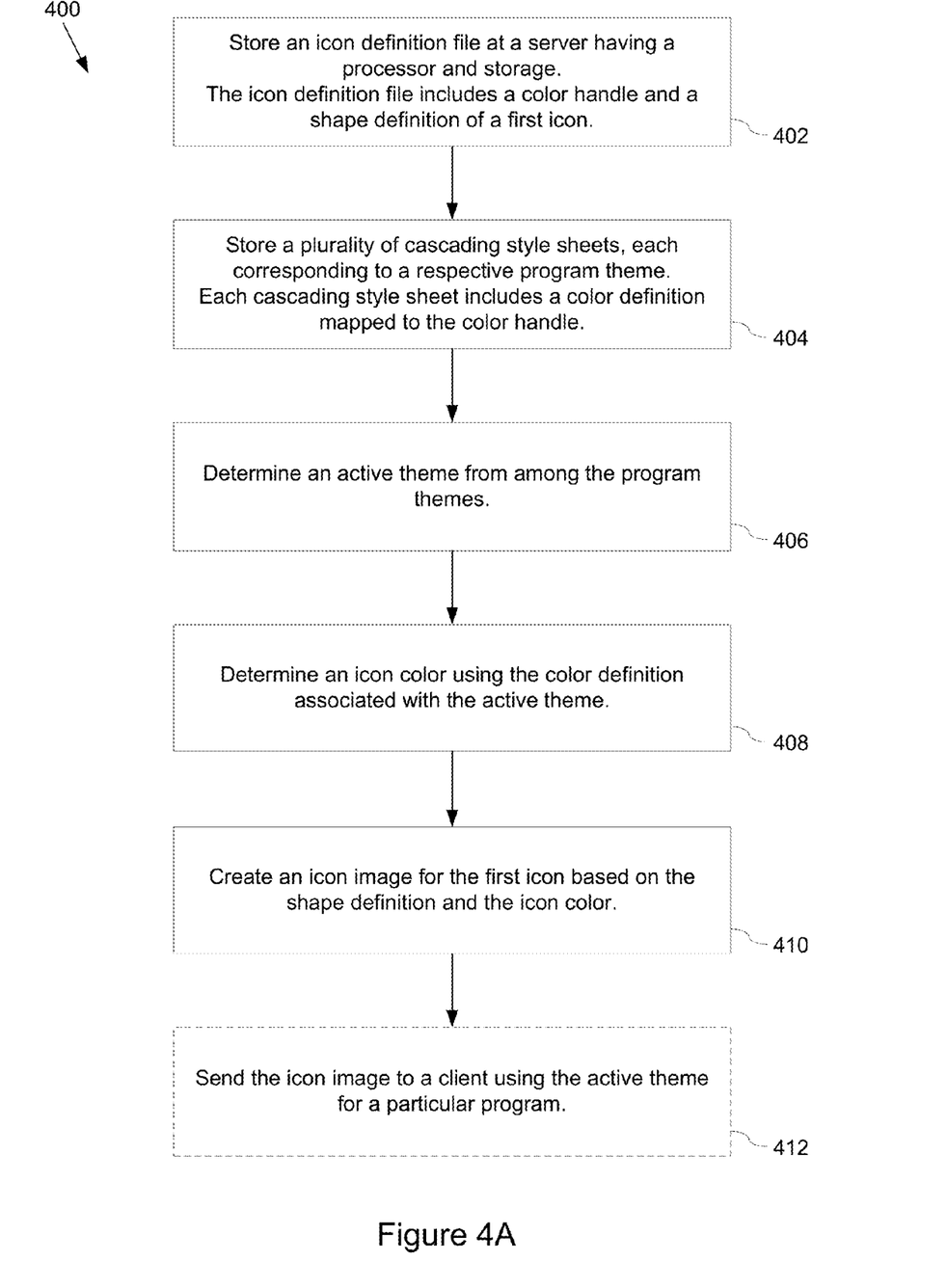
FIGS. 4A-B are flow diagrams illustrating a process for dynamically defining icon color for program themes in accordance with some embodiments of the present invention.

FIG. 4A is a flow chart of a method 400 for defining icon color of one or more icons according to some embodiments. The following operations are performed at a server having a processor (e.g., processing unit 502 (FIG. 5)) and storage (e.g., memory 508 (FIG. 5)). The server (e.g., server 110 (FIG. 1A)) dynamically generates an icon image based upon a shape definition (e.g., shape definition 132 (FIG. 1A)) associated with a particular icon and a color definition (e.g., color definition 124 (FIG. 1A)) in a style sheet (e.g., style sheet 122 (FIG. 1A)) associated with a user-selected theme (e.g., theme 136 (FIG. 1A)).

A plurality of icon definition files are stored at the server (402). In some embodiments, the plurality of icon definition files are stored in an icon definition file library (e.g., icon definition file library 126 (FIG. 1A)). As detailed above in connection with FIG. 1A, each of the plurality of icon definition files includes a color handle (e.g., color handle 130 (FIG. 1A)) and a shape definition of a first icon.

Additionally, a plurality of cascading style sheets, each corresponding to a respective program theme, are stored at the server (404). In some embodiments, the plurality of cascading style sheets are stored in a style sheet library (e.g., style sheet library 120 (FIG. 1A)). As detailed above in connection with FIG. 1A, each of the plurality of cascading style sheets includes a color definition (e.g., color definition 124 (FIG. 1A)) that is mapped to the color handle.

The method 400 further includes determining an active theme from among the program themes (406). In some embodiments, the active theme is stored in a user profile (e.g., user profile 134 (FIG. 1A)). An icon color is then determined by accessing the color definition in the style sheet associated with the active theme (408). An icon image for the first icon is then created based on the shape definition of the first icon and the icon color determined from the color definition (410). In some embodiments, the icon image is sent to a client using the active theme for a particular program (412).

Figure 4B:
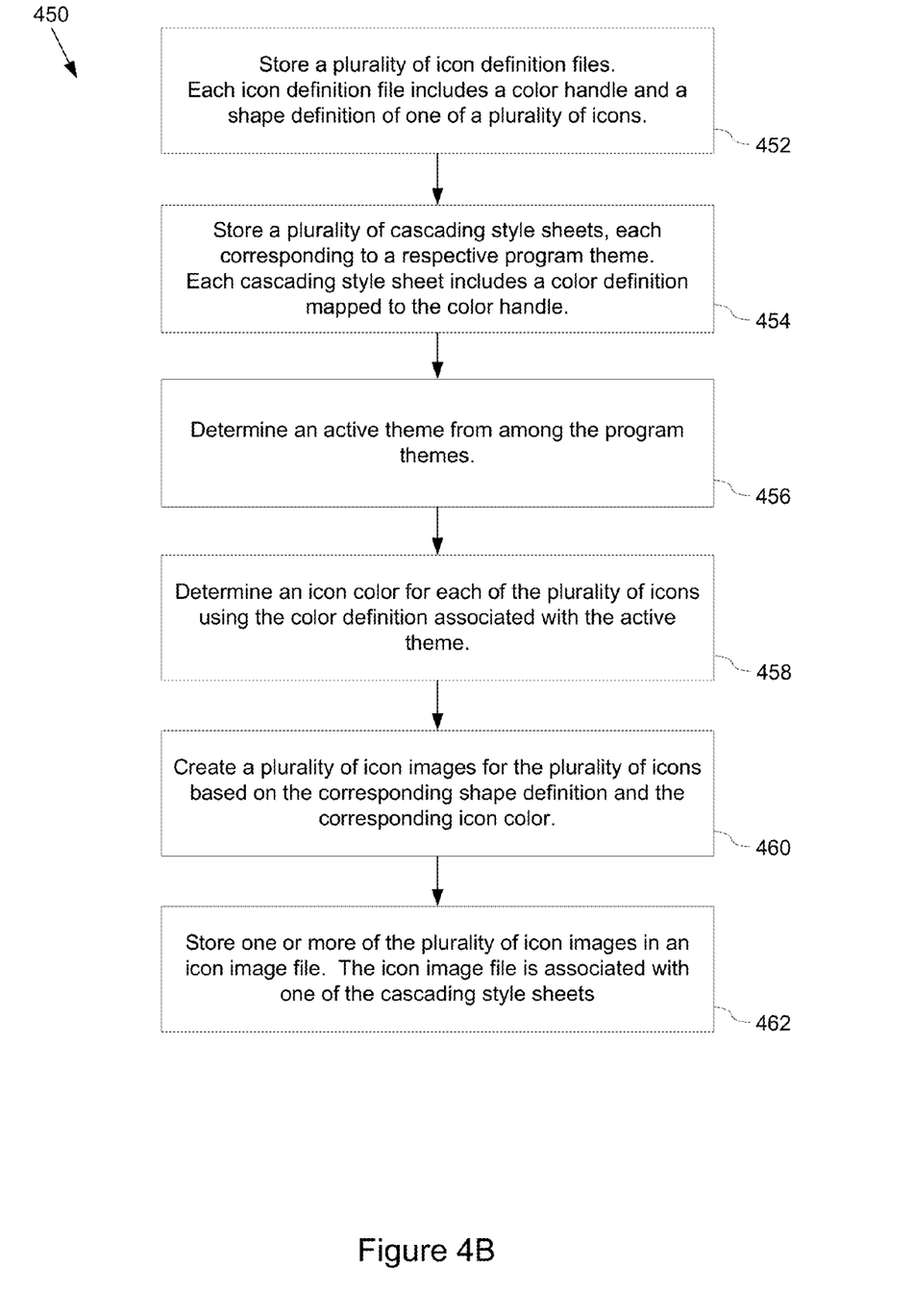

FIG. 4B is a flow chart of a method 450 for defining a plurality of icon colors according to some embodiments. The following operations are performed at a server (e.g., server 110 (FIG. 1A)) having a processor (e.g., processing unit 502 (FIG. 5)) and storage (e.g., memory 508 (FIG. 5)). In contrast to the method 400 described above in connection with FIG. 4A, a plurality of icon images are created for a plurality of icons and the icon images are stored in an icon image file associated with a particular theme or webpage for quick retrieval by the server. The server (e.g., server 110 (FIG. 1A)) dynamically generates an icon image based upon a shape definition (e.g., shape definition 132 (FIG. 1A)) associated with a particular icon and a color definition (e.g., color definition 124 (FIG. 1A)) in a style sheet (e.g., style sheet 122 (FIG. 1A)) associated with a user-selected theme (e.g., theme 136 (FIG. 1A)).

A plurality of icon definition files (e.g., icon definition file 128 (FIG. 1A)) are stored at the server (452). In some embodiments, the plurality of icon definition files are stored in an icon definition file library (e.g., icon definition file library 126 (FIG. 1A)). As stated above in connection with FIG. 1A, each of the plurality of icon definition files includes a color handle (e.g., color handle 130 (FIG. 1A)) and a shape definition of one of a plurality of icons.

A plurality of cascading style sheets, each corresponding to a respective program theme, are also stored at the server (454). In some embodiments, the plurality of cascading style sheets are stored in a style sheet library (e.g., style sheet library 120 (FIG. 1A)). As stated above in connection with FIG. 1A, each of the plurality of cascading style sheets includes a color definition mapped to the color handle.

Method 450 further includes determining an active theme from among the program themes (456). In some embodiments, the active theme is stored in a user profile (e.g., user profile 134 (FIG. 1A)).

In some embodiments, the server uses an identification tag in a webpage to identify a plurality of icons in that webpage. In other embodiments, the web application may request a plurality of icons. An icon color is then determined for each of the plurality of icons by accessing the color definition in the style sheet associated with the active theme (458). A plurality of icon images are then created for the plurality of icons by accessing the corresponding shape definition for each of the plurality of icons and applying the corresponding icon color (460). In some embodiments, one or more of the plurality of icon images are stored at the server in an icon image file (e.g., icon image file 140 (FIG. 1A)) (462), which is associated with one of the cascading style sheets. In some embodiments, the icon image file is stored in an icon image file library (e.g., icon image file library 138 (FIG. 1A)).

The methods described in FIGS. 3A and 3B may be governed by instructions that are stored in a computer readable storage medium and that are executed by one or more processors of one or more servers. Each of the operations shown in FIGS. 3A and 3B may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted and/or executable by one or more processors.

Figure 5:
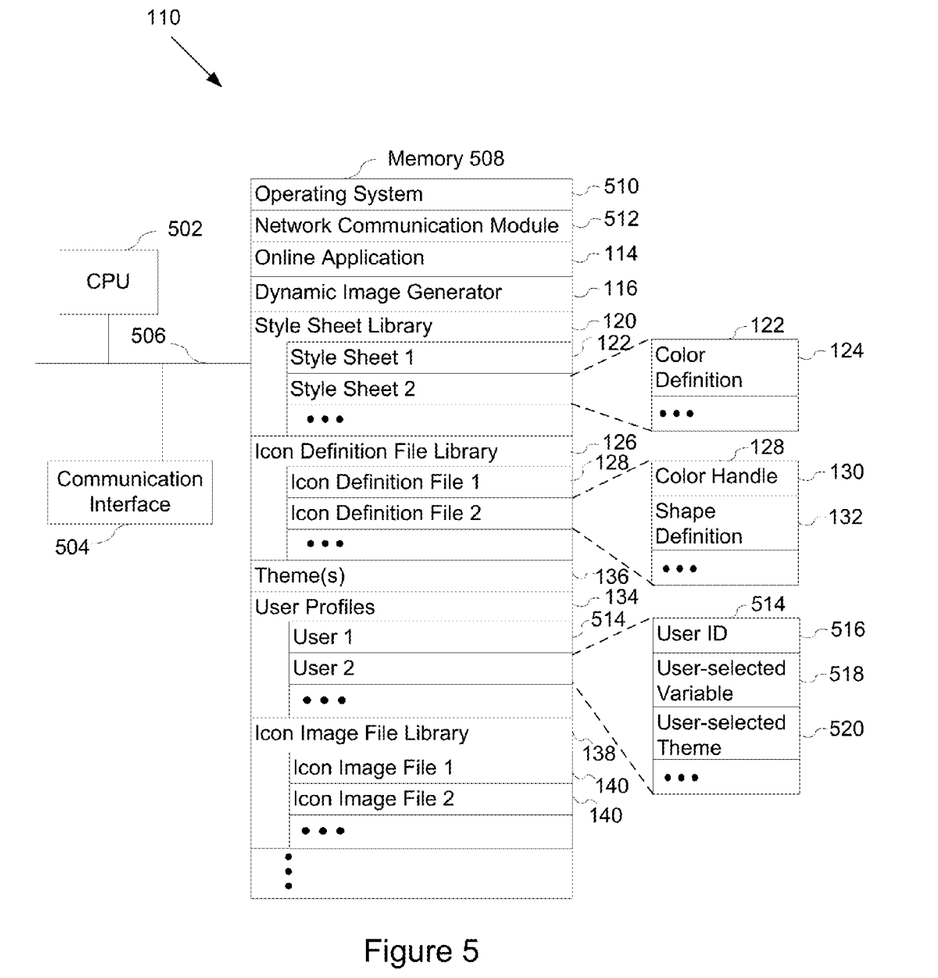
FIG. 5 is a block diagram illustrating an exemplary information server in accordance with some embodiments of the present invention.

FIG. 5 is a block diagram illustrating an exemplary server 110 is accordance with some embodiments. The server 110 typically includes one or more processing units (CPU's) 502, one or more network or other communications interfaces 504, memory 508, and one or more communication buses 406 for interconnecting these components. The communication buses 506 may include circuitry (sometimes called a chipset) that interconnects and controls communications between system components.

Memory 508 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 508 may optionally include one or more storage devices remotely located from the CPU(s) 502. Memory 508, or alternately the non-volatile memory device(s) within memory 508, comprises a computer readable storage medium. In some embodiments, memory 508 stores the following programs, modules and data structures, or a subset thereof:

- an operating system 510 that includes procedures for handling various basic system services and for performing hardware dependent tasks;
- a network communication module 512 that is used for connecting the server 110 to other computer systems via the one or more communication interfaces 504 (wired or wireless) and one or more communication networks, such as the Internet, other wide area networks, local area networks, metropolitan area networks, and so on;
- an online application 114;
- a dynamic image generator 116;

a style sheet library 120, including one or more style sheets 122, each of which include a color definition 124;

an icon definition file library 126, including one or more icon definition files 128, each of which include a color handle 130 and a shape definition 132;

one or more themes 136;

one or more user profiles 134; and an icon image file library 138, including one or more icon image files 140.

In some embodiments, the online application 114 may be a webmail application or other type of online application. The dynamic image generator 116 generates icon images in accordance with one or more user-selected variables, as explained above.

The style sheet library 120 may store one or more style sheets 122. The various style sheets are utilized by the dynamic image generator 116 to send and create icon images in accordance with the user-selected variables.

The user profiles database 134 stores information specific to each user. In some embodiments, an individual user profile 514 (e.g., User 2) may include a user ID 516, one ore more user-selected variables 518, and other information specific to the user. Once a user ID 516 has been assigned to a user, the user may log onto a website or online application using their user ID 516. The user then may select a variable (user-selected variable 518) in order to customize the appearance of the website or online application. In some embodiments, the user-selected variable 518 is a user-selected color definition. Additionally, the user may select a theme (user-selected theme 520) as an active theme from one of the themes 136. The user-selected variable 518 and/or the user-selected theme 520 are then stored in the user profile 514 for that particular user.

Each of the above identified elements may be stored in one or more of the previously mentioned memory device. The applications, functions, modules, and operating systems shown in FIG. 5 correspond to a set of instructions for performing the functions described above. The set of instructions can be executed by one or more processors (e.g., the CPUs 502). The above identified modules or programs (i.e., sets of instructions) need not be implemented as separate software programs, procedures or modules, and thus various subsets of these modules may be combined or otherwise re-arranged in various embodiments. In some embodiments, memory 508 may store a subset of the modules and data structures identified above. Furthermore, memory 508 may store additional modules and data structures not described above.

Although FIG. 5 shows a "server," FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on a single server and single items could be implemented by one or more servers. The actual number of servers used to implement server 110 and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for defining icon color for program themes, comprising:

at a server having a processor and storage:

storing an icon definition file that includes a color handle and a shape definition of a first icon, wherein the color handle defines a color variable for the first icon, respective style sheets include respective color definitions for the color variable, and a respective color definition specifies a respective color value for the color variable;

storing a plurality of style sheets, each corresponding to a respective program theme, each of the style sheets including a respective color definition mapped to the color handle;

determining an active theme for a specific client device from among the program themes, wherein a first style sheet of the plurality of style sheets corresponds to the active theme, the first style sheet including a first color definition specifying a first color value for the color variable;

determining whether a user profile corresponding to a user of the specific client device includes color information for the first icon, wherein the color information is independent of theme;

in accordance with a determination that the user profile includes the color information, determining an icon color based on the color information;

in accordance with a determination that the user profile does not include the color information, determining an icon color using the first color value specified by the first color definition; and creating an icon image for the first icon based on the shape definition and the determined icon color.

2. The method of claim 1, further comprising:

sending the icon image to a client using the active theme for a particular program.

3. The method of claim 1, wherein the active theme is user-selected from a plurality of themes presented on a client.

4. The method of claim 1, wherein the shape definition is in a scalable vector graphics format.

5. The method of claim 1, wherein the icon image is created after a request from the client.

6. The method of claim 1, wherein the first color definition is user defined.

7. The method of claim 1, wherein determining the icon color using the first color value specified by the first color definition comprises determining the icon color in accordance with the time of day.

8. A system for defining icon color for program themes, comprising:

memory;

one or more processors; and one or more modules stored in memory and configured for execution by the one or more processors, the modules comprising instructions to:

store an icon definition file that includes a color handle and a shape definition of a first icon, wherein the color handle defines a color variable for the first icon, respective style sheets include respective color definitions for the color variable, and a respective color definition specifies a respective color value for the color variable;

store a plurality of style sheets, each corresponding to a respective program theme, each of the style sheets including a respective color definition mapped to the color handle;

determine an active theme for a specific client device from among the program themes, wherein a first style sheet of the plurality of style sheets corresponds to the active theme, the first style sheet including a first color definition specifying a first color value for the color variable;

determine whether a user profile corresponding to a user of the specific client device includes color information for the first icon, wherein the color information is independent of theme;

in accordance with a determination that the user profile includes the color information, determine an icon color based on the color information;

in accordance with a determination that the user profile does not include the color information, determine an icon color using the first color value specified by the first color definition; and create an icon image for the first icon based on the shape definition and the determined icon color.

9. The system of claim 8, further comprising:
instructions to send the icon image to a client using the active theme for a particular program.

10. The system of claim 8, wherein the active theme is user-selected from a plurality of themes presented on a client.

11. The system of claim 8, wherein the shape definition is in a scalable vector graphics format.

12. The system of claim 8, wherein the icon image is created after a request from a client.

13. The system of claim 8, wherein the first color definition is user defined.

14. A computer program product for use in conjunction with a computer system, the computer program product comprising a non-transitory computer readable storage medium and a computer program mechanism embedded therein, the computer program mechanism comprising instructions to:

store an icon definition file that includes a color handle and a shape definition of a first icon, wherein the color handle defines a color variable for the first icon, respective style sheets include respective color definitions for the color variable, and a respective color definition specifies a respective color value for the color variable;

store a plurality of style sheets, each corresponding to a respective program theme, each of the style sheets including a respective color definition mapped to the color handle;

determine an active theme from among the program themes, wherein a first style sheet of the plurality of style sheets corresponds to the active theme, the first style sheet including a first color definition specifying a first color value for the color variable;

determine whether a user profile corresponding to a user of the specific client device includes color information for the first icon, wherein the color information is independent of theme;

in accordance with a determination that the user profile includes the color information, determine an icon color based on the color information;

in accordance with a determination that the user profile does not include the color information, determine an icon color using the first color value specified by the first color definition; and create an icon image for the first icon based on the shape definition and the determined icon color.

15. The computer program product of claim 14, further comprising:
instructions to send the icon image to a client using the active theme for a particular program.

16. The computer program product of claim 14, wherein the active theme is user-selected from a plurality of themes presented on a client.

17. The computer program product of claim 14, wherein the shape definition is in a scalable vector graphics format.

18. The computer program product of claim 14, wherein the icon image is created after a request from a client.

19. The computer program product of claim 14, wherein the first color definition is user defined.

\* \* \* \* \*